July 31, 1934.　　　E. W. SEEGER ET AL　　　1,968,358
MOTOR CONTROL SYSTEM
Filed Oct. 4, 1930
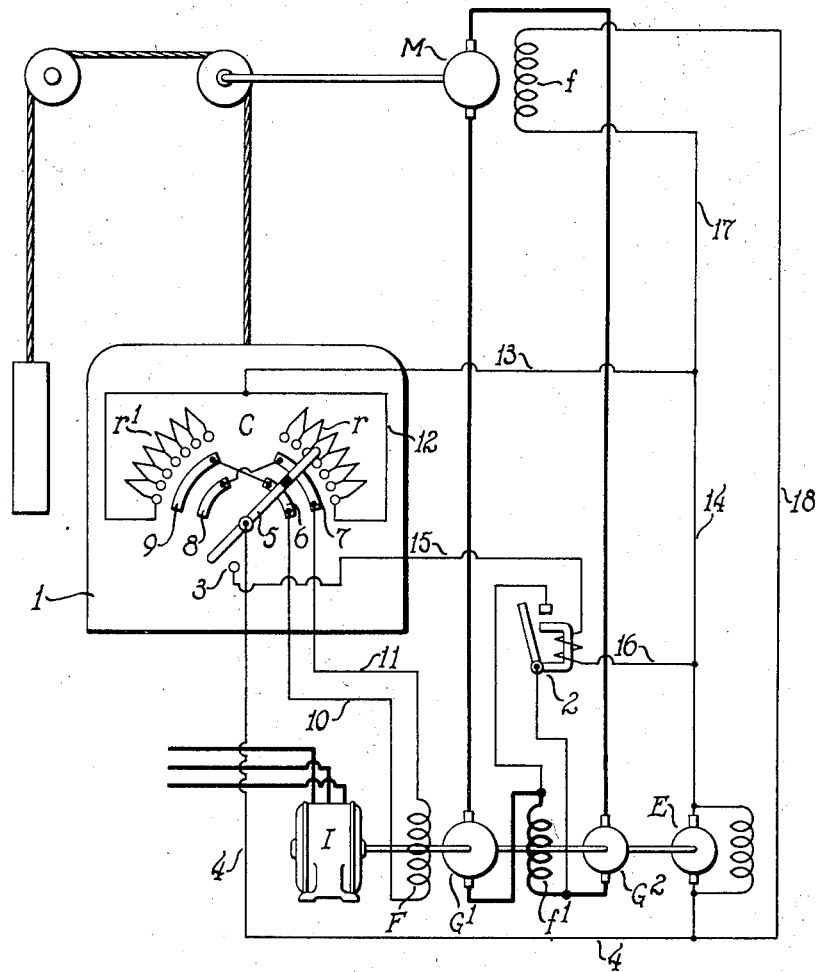
Inventors
Edwin W. Seeger
John L. Defandorf
By Frank H. Hubbard
Attorney Patented July 31, 1934

1,968,358

UNITED STATES PATENT OFFICE 1,968,358

MOTOR CONTROL SYSTEM

Edwin W. Seeger, Wauwatosa, and John L. Defandorf, Shorewood, Wis., assignors to Cutler-Hammer, Inc., Milwaukee, Wis., a corporation of Delaware Application October 4, 1930, Serial No. 486,352

2 Claims. (Cl. 172—239)

This invention relates to improvements in motor control systems of the variable voltage type wherein the controlled motor has its armature connected with the armature of its supply generator in a closed loop.

In such a system it has been customary to provide the generator with a series field in order to obtain under different load conditions the same speed for a given setting of the control element which is commonly a rheostat controlling the shunt field of the generator. However, this provision has the disadvantage that when the motor is at a standstill and the generator shunt field is open circuited the series field tends to cause building up of the current in the armature loop resulting from the residual magnetism of the generator field. Also providing the main generator with a series field winding in addition to the shunt field winding has the disadvantage that due to high induction of the shunt field winding variations in generator flux in response to changes in the armature current are sluggish.

As an alternative to the provision of a series field winding for the generator it has heretofore been proposed to provide the generator with an additional field winding supplied with current from a second generator coupled to the main generator and excited by the current traversing the armature loop, but this scheme also has the aforementioned disadvantage of sluggishness.

The present invention has among its objects to provide a system overcoming the aforementioned disadvantages of the systems heretofore employed.

According to the present invention it is proposed to use in conjunction with a separately excited main generator a series wound auxiliary generator connected in the armature loop with provision for short-circuiting the field of the auxiliary generator when the motor is at a standstill.

An embodiment of the invention is diagrammatically illustrated in the accompanying drawing and the same will now be described, it being understood that such embodiment is capable of various modifications without departing from the scope of the appended claims.

Referring to the accompanying drawing, the same shows a conventional variable voltage drive for an elevator car 1, this drive comprising a motor M supplied from a generator $G^1$ driven by a constantly running induction motor I. The motor M has its armature connected in a closed loop with the armature of the generator $G^1$ and said motor and generator have separately excited field windings $f$ and F, respectively, which are supplied by an exciter E coupled to the drive of generator $G^1$. The field winding $f$ of motor M is shown as connected directly across the exciter circuit, whereas the field winding F of the generator $G^1$ is connected to the exciter through a controller C provided on the elevator car 1. The controller C, as will appear, provides for reversing the connections between the generator field winding and the exciter and for including more or less resistance in series with the generator field winding. As will be understood, reversal of the field of the generator effects reversal of motor M while variation of the resistance in the circuit of the generator field winding varies the potential impressed upon motor M.

To this conventional system there is added a generator $G^2$ having a series field winding $f^1$, said generator being connected in the loop including the armatures of motor M and generator $G^1$. This auxiliary generator $G^2$ is shown as coupled to the main generator $G^1$ to be driven therewith and its field winding $f^1$ is provided with a short-circuit controllable by an electroresponsive switch 2 which in turn is controlled by contacts 3 of the car controller C. The arrangement is such that when the car controller is in any running position it deenergizes the switch 2 to open the short-circuit around the field winding of auxiliary generator $G^2$, whereas when the elevator controller is thrown to off position its contacts 3 engage to energize switch 2 to short-circuit the field winding $f^1$.

The auxiliary generator $G^2$ is preferably so designed that at full excitation it generates approximately ten percent of the maximum voltage generated by the main generator. It is provided to act cumulatively with the main generator to assist the latter under positive load conditions and to generate a voltage opposite to that of the main generator to lower the total voltage supplied to the armature of motor M when said motor is overhauled by its load. On the other hand, the switch 2 provides for short-circuiting the field $f^1$ of the auxiliary generator when the controller C is thrown to off position, thus eliminating the influence of the auxiliary generator and permitting a strong dynamic braking action to bring the motor M to rest. Thus it will be apparent that a system wherein an auxiliary generator is so utilized will afford the desired control of the motor free from the aforementioned disadvantages of the prior systems.

Considering the control circuits, the same are as follows. With the controller C in the position illustrated circuit may be traced from one side of the exciter by conductor 4 to the controller arm 5 and contact 6, by conductor 10 through the field winding of generator $G^1$ by conductor 11 to controller contact 7, by arm 5 to and through resistance $r$, by conductors 12, 13 and 14 to the opposite side of the exciter. On the other hand, assuming movement of the controller to the opposite side of its central position circuit may be traced as aforedescribed to the controller arm 5 to contact 8 and thence to cross connected contact 7 by conductor 11 through the generator field winding F by conductor 10 to controller contact 6 and cross connected contact 9 through the controller arm and resistance $r^1$ to the exciter, as previously traced. As will be apparent, these circuits provide for reversal of the field of the main generator.

With the controller arm 5 in off or neutral position circuit may be traced from the exciter through said arm to contact 3 by conductor 15 to and through the winding of switch 2 by conductor 16 to conductor 14 and thence back to the exciter.

As previously stated, the field winding $f$ of the motor M is connected directly across the exciter circuit, it being connected by conductors 18 and 4 to one side of the exciter, and by conductors 17 and 14 to the opposite side of said exciter.

What we claim as new and desire to secure by Letters Patent is:

1. In combination, a motor, a supply generator therefor, a closed loop including the armatures of said motor and generator, means controlling the excitation of said generator to effect starting and stopping of said motor, a series wound auxiliary generator connected in said closed loop, and means under the control of the aforementioned control means to short-circuit the field winding of said auxiliary generator as an incident to stopping of said motor and to interrupt said short-circuit as an incident to starting of said motor.

2. In combination, a motor, a main generator, a closed loop including the armatures of said motor and said generator, an auxiliary series excited generator included in said loop and dependent for excitation upon the current traversing said loop, means affording a separate current supply upon which excitation of said main generator is wholly dependent, and means to control excitation of said main generator and to short-circuit the field winding of said auxiliary generator when discontinuing excitation of said main generator.

EDWIN W. SEEGER.
JOHN L. DEFANDORF.